US011238025B2

(12) United States Patent
Mietke et al.

(10) Patent No.: US 11,238,025 B2
(45) Date of Patent: *Feb. 1, 2022

(54) DATA REPAIR WITHIN PRODUCTIVE SYSTEM

(71) Applicant: SAP SE, Walldorf (DE)

(72) Inventors: Sebastian Mietke, Wiesloch (DE); Toni Fabijancic, Eppelheim (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/930,775

(22) Filed: May 13, 2020

(65) Prior Publication Data

US 2020/0272616 A1  Aug. 27, 2020

Related U.S. Application Data

(63) Continuation of application No. 15/407,645, filed on Jan. 17, 2017, now Pat. No. 10,713,234.

(51) Int. Cl.
*G06F 16/00* (2019.01)
*G06F 16/23* (2019.01)

(52) U.S. Cl.
CPC .................. *G06F 16/2365* (2019.01)

(58) Field of Classification Search
None
See application file for complete search history.

(56) References Cited

U.S. PATENT DOCUMENTS

| 9,436,583 | B1* | 9/2016 | Chen | G06F 11/14 |
|---|---|---|---|---|
| 2008/0126841 | A1* | 5/2008 | Benhanokh | G06F 11/1064 |
| | | | | 714/5.11 |
| 2008/0218373 | A1* | 9/2008 | Lanigan | G07C 9/00182 |
| | | | | 340/5.1 |
| 2013/0055018 | A1* | 2/2013 | Joshi | G06F 11/008 |
| | | | | 714/19 |
| 2013/0339826 | A1* | 12/2013 | Freking | G06F 11/0793 |
| | | | | 714/799 |
| 2014/0059555 | A1* | 2/2014 | Bacher | G06F 11/3664 |
| | | | | 718/102 |
| 2015/0286434 | A1* | 10/2015 | Dain | G06F 3/0619 |
| | | | | 711/103 |
| 2017/0124141 | A1* | 5/2017 | Munir | G06F 11/3476 |

\* cited by examiner

*Primary Examiner* — Bai D Vu
(74) *Attorney, Agent, or Firm* — Buckley, Maschoff & Talwalkar LLC

(57) ABSTRACT

Provided are devices and methods for repairing corrupt data using a secure environment in a productive system. In one example, the method includes receiving a request to modify a base table stored in a productive environment, generating a child table corresponding to the base table within a secure environment of the productive system, modifying the one or more table entries from the base table and storing the modified table entries in the child table, executing one or more operations on the child table within the secure environment to determine if the one or more modified table entries repair the base table, and outputting a determined result of the one or more operations to a user interface. As a result, corrupt data can be modified locally via inheriting tables within a secured environment without any further damage being done to productive data in a productive environment.

20 Claims, 8 Drawing Sheets

DATA REPAIR WITHIN PRODUCTIVE SYSTEM

CROSS-REFERENCE TO RELATED APPLICATION(S)

This application is a continuation of U.S. patent application Ser. No. 15/407,645, filed on Jan. 17, 2017, in the United States Patent and Trademark Office, the entire disclosure of which is incorporated herein for all purposes.

BACKGROUND

Data corruption is one of the more common computer errors. Corruption typically occurs when code or other stored computer data is intentionally or unintentionally changed from its original, correct form. The errors resulting in data corruption may be introduced to the data during reading, writing, storage, processing, transmission, and the like, which can cause unintended changes to the data. The corruption can be systematic or random, and even a small change can fundamentally break a program, render a file useless, or even crash a system. Some of the causes for data corruption include infection by malware, improperly exiting a program, hardware malfunction, incorrectly written code, and the like. Oftentimes, however, the root cause of the data corruption in a productive (or production) system is unknown, at least initially. To further complicate the situation, it may be very difficult to reproduce the data corruption from the productive system in a test system due to the differences in code between the productive system and the test system, customization of the data in the productive system by different clients, previous manual data repairs performed on the data, and the like.

When data becomes corrupt, it is of paramount importance to fix the issue before further damage occurs. Ideally, it would be best to restore a clean backup copy of the data as it was before the corruption. However, restoring a backup of the data can be time consuming and results in downtime. Furthermore, in certain situations it is not possible to restore an old copy of the data, for example, if the corrupt data remains undetected for a significant period of time the backup data may be too old. In addition, copying the corrupt data to a test system might also be difficult if not impossible. In order to copy the data, all the related entries have to be identified. Additionally the code and the customizing of the code has to be exactly the same in both the productive system and the test system. Another option is to repair the productive data while it is active within the productive system. However, repairing the data correctly without allowing any further damages can be a challenging task. For example, error situations during install of complex changes could lead to time-consuming repairs. A common scenario is that one or more objects are copied to a lower release, while they contain functionality that is only available in higher releases. As a result, syntax errors may occur and the objects must be repaired and restored one by one. Also, locating an issue within a productive system can be time consuming due to modifications by a client. As a result, a productive system might be down for a significant period of time while the errors are identified and fixed.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
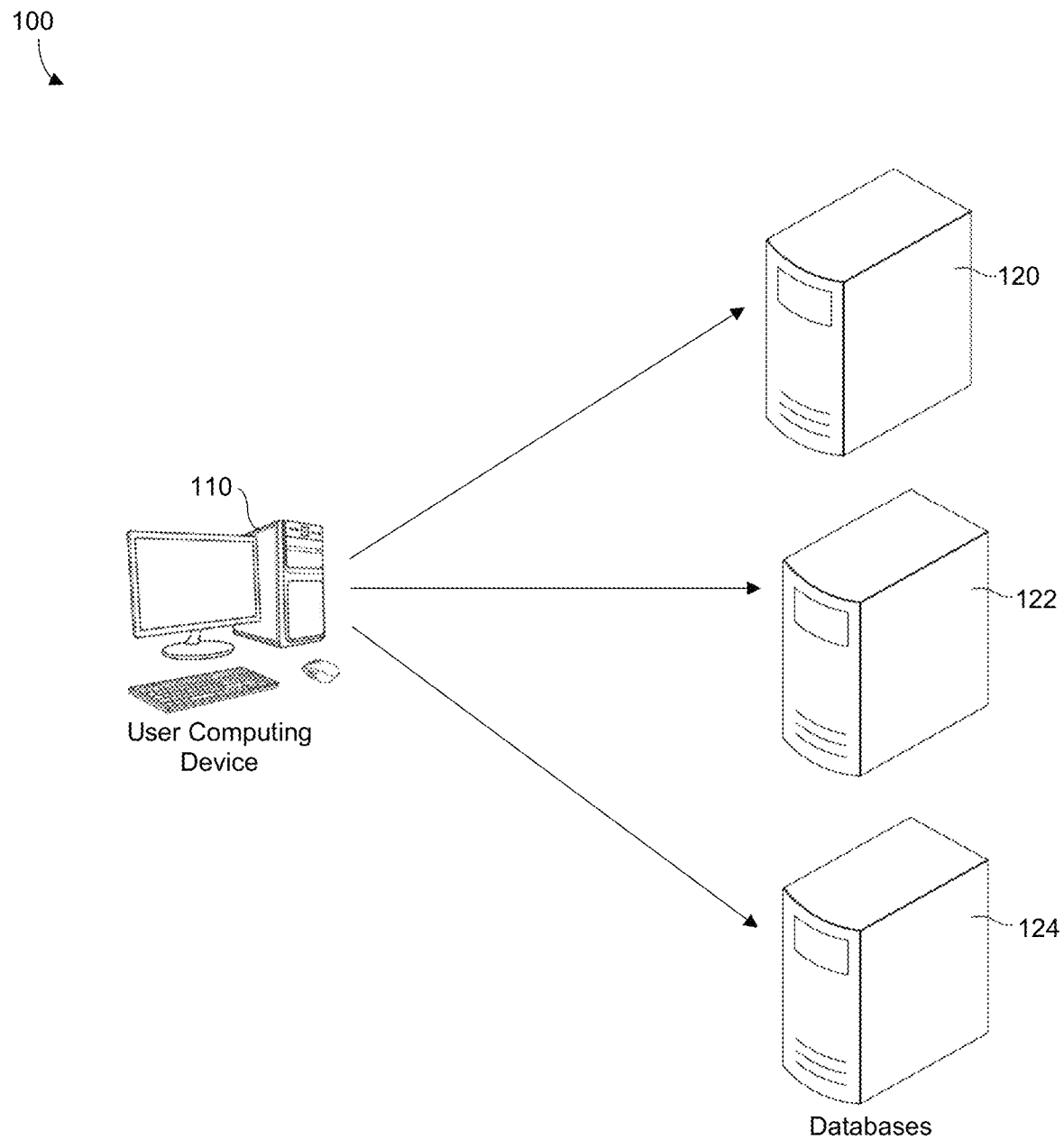
FIG. 1 is a diagram illustrating a system for repairing corrupt data in a productive system in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

As described herein, a productive system (or production system) refers to a running computer processing system of an operational business or industrial entity. The entity that uses the system may have expectations that the system, as well as the corresponding data, will be readily and continuously available in order to allow for a smooth and undisturbed operation of the business or industrial entity. Data corruption often occurs within a productive system. However, it can be very inconvenient if data repair is performed directly in the data storage of the productive system because this often requires the productive system to be shut down or otherwise risk further damage. A productive environment is a term used by developers to describe the setting within the productive system in which software and other products are actually put into operation for their intended uses by end users. The productive environment can be thought of as a real-time setting where programs are run and hardware setups are installed and relied on for organization or commercial daily operations. In contrast, a testing environment (of a testing system) typically includes a product that is still being used and operated on theoretically. In the testing environment, the users (which are typically engineers) often look for bugs or design flaws. This environment differs from a productive environment in which the product has been delivered and needs to work flawlessly.

The example embodiments are directed to a device and method for modifying and repairing productive data of a productive system within a secure environment established within the productive system. The secure environment may be generated or otherwise established inside the productive system such that it is separate from the productive environment, for example, logically and/or physically separated. When a user attempts to modify the corrupt data such as through one or more operations, the corrupt data may be transferred into the secure environment. Accordingly, the corrupt data can be modified and tested locally and securely within in the secure environment of the productive system without influencing a productive environment of the productive system. In this way, repairs to the corrupt data can be identified without requiring the system to go down. As referred to herein, a productive system may be used to store data, for example, business related data that is operated on by an organization and its users, other types of data, different code versions of data, and the like. The productive system may refer to a database, a server, a computer, and the like. Productive data is typically not capable of being modified by a third party database storage provider such as a cloud storage provider, server storage provider, and the like. The secure environment provides a secure container within the productive system that enables a third party or a local user such as an administrator to access the productive data and perform operations on the data in an effort to repair corrupt data or data that is not behaving as otherwise expected.

According to various embodiments, a reserved entity type such as a test user may access the secure environment when they log into the productive system. When the test user performs an operation on a base table to modify data therein, for example, a modify, a delete, an insert, a write, a repair, or the like, the productive system may generate a child table within the secure environment that inherits table entries from a base table stored in the productive environment. The table entries may be inherited on a database level from the productive environment into the secure environment. In other words, the table entries may be transferred from the productive environment to the secure environment without a user being aware of the transfer or the child table. Furthermore, the data that is inherited may be modified based on the input operation before it is stored in the child table. The test user may perform test operations and commands on the inherited data in the child table instead of performing the test operations on active productive data from the productive environment. When a fix or a repair is determined for the corrupt data, the modified child table may be written to the productive environment thereby replacing the corrupt data in the base table with the modified repaired data. As a result, it possible to redefine table entries in the secure environment, while keeping the original data operating in the productive environment until a repair is determined.

In operation, when a productive user accesses the productive system, the productive user may only be allowed access to the productive data stored within the productive environment. For example, a productive user may read data, write data, select data, modify data, and the like, based on data directly retrieved from a productive storage environment of the productive system. However, when a reserved user such as a test user accesses the productive system, the inheritance may be switched on for the user. In this case, child tables may be created in the secured storage environment that inherit table data (i.e., replicate) from base tables in the productive environment unbeknownst to the test user. In other words, the inheritance may be switched on and child tables may be generated automatically by the test user without the test user being aware of the inheritance.

In some examples, the generation of the child table may only be performed if data from the base table is modified by the test user. However, if the data is merely selected a child table may not be generated. Instead, the data may be retrieved directly from the base table within he productive environment. The changes and/or modifications to the data performed by the test user are written to the child tables. It may also be possible that existing child tables exist and are consumed when the test user performs a select operation on the data. When the test user performs operations on the data such as SQL operations, read, write, and the like, the system may retrieve the inherited data from the child tables within the secured environment rather than retrieve the active productive data from the productive environment. For example, the productive system may generate and store access sequence information or instructions which indicate to the system if a base table has any child tables, grandchild tables, etc. When the reserved user selects a particular data set or data table to test, instead of accessing the data from the productive system, the data may be accessed from the child tables included in the secure environment, It should also be appreciated that the test user is merely an example and the inheritance could be switched on/off by other entities. For example, the inheritance could be switched on/off for a predetermined period, an application component, a software component, a software package, and the like. All changes performed by the test user may be written to the inheriting child tables within the secure environment and not to the base tables within the productive environment. In this way, it is possible for the test user to execute an entire end-to-end scenario (including database operations) on modified data included in the inheriting tables within the secured environment without any further damage being done to productive data in the productive environment. Also, client dependent and client independent customizing may be redefined in the productive system for test and repair purposes. All other users of the productive system may not be affected by the actions of the test user being performed and may operate on the data as they normally would because they do not see any inherited entries.

If the inherited data is not repaired correctly or any unwanted side effects appear, the system may drop all inheriting tables and start fresh. As a result, the test user can start again with a new approach. When the corrupt data is repaired correctly, the changed data from the child tables stored in the secure environment may be transferred to the base tables from which they depend in the productive environment. In this case, because a secure environment is created inside a productive system, where the full functionality can be used and entire end-to-end scenarios can be executed without any harm to the productive data, no time consuming expensive backups are required and no system downtime is needed.

As another example, the inheritance might also be applied for switching modifications on/off, because the code is also stored with all version information within database tables. For example, modifications may be stored in the corresponding child tables as well. In this way, any of the modifications could be switched off, if necessary, to determine if an issue results from a modification or not. Here, modifications as well as new business add in (BAdI) implementations could be tested in the productive system. In another embodiment, the inheritance may be used for creating restoring points for system related data and master data separately. For example, code could be restored from a previous version, while keeping all master data. This enables a new way of version management, because it is also possible to set a restore point for an application, software component, or the like. The restore points may also be used during retrofitting. If new features or large corrections have been implemented, an install and retrofit may become very complex. As another example, changes of objects may be copied into releases by accident, which are not relevant. As a consequence, syntax errors might occur. Time-consuming repairs can be avoided by restoring the system in parts through the inheritance process described herein.

FIG. 1 illustrates a system 100 for repairing corrupt data in a productive system in accordance with an example embodiment. Referring to FIG. 1, the system 100 includes a user computing device 110, for example, a workstation, a computer, a server, a cloud platform, a mobile device, a laptop, a notebook, a tablet, and the like. The system 100 also includes a plurality of databases 120, 122, and 124. In this example, the plurality of databases 120, 122, and 124 may store client data and may be associated with the same client or different clients. Each of the databases 120, 122, and 124 may be referred to as production systems (also described herein as productive systems). In various embodiments, a production system is a system in which daily business activities occur and may be the database on which the end users perform their daily job functions, in comparison to a development system where most implementation work occurs, a quality assurance system where final testing is conducted before moving transports to the production system, and the like.

According to various aspects, the user computing device 110 may be used to access and repair corrupt data stored on one or more of the databases 120, 122, and 124. For example, the user computing device 110 may connect to one or more of the databases 120, 122, and 124 through a network such as a private network, a public network, the Internet, and the like. Rather than access the databases 120, 122, and 124 as a productive user, the a user of the user computing device 110 may access the databases 120, 122, and 124 as a reserved user (also referred to herein as a test user) which allows the user computing device 110 access to a secure environment that is separate from the productive environment of the databases 120, 122, and 124. For example, the secure environment may be logically and/or physically separated from the productive environment within the databases 120, 122, and 124. The reserved user may correspond to an administrator of the productive database systems, a third party provider of the productive systems, or the like. In response to a user of the user computing device 110 logging in or otherwise accessing one or more of the databases 120, 122, and 124 as the reserved user instead of a productive user, the user computing device 110 interacts differently with the data stored in the databases 120, 122, and 124. Here, the login may be performed via a web-based portal, a virtual link or firewall, a direct connection, a local login, or the like.

Within the secure environment, the test user of the user computing device 110 can access the productive data of the databases 120, 122, and 124 through table inheritance. For example, the inheritance may be "turned on" in response to the test user accessing the productive system of the databases 120, 122, and 124. The test user may receive a user interface which allows the user to select one or more data tables included in the productive environment which the user wishes to repair or modify. As another example, the data tables from the productive environment might be automatically selected by the system while the test user works on the system as usual. For example, when the user performs a database operation which modifies the data from a database table in the productive environment, a new child table may be generated in the secure environment of the databases 120, 122, and 124, which inherit table entries from base tables stored in the productive environment of the databases 120, 122, and 124. Also, the modification performed by the test user is written to the child table and not the base table.

As one example, when the test user accesses database 120 and runs operations on base tables of the database 120, the database 120 may establish a secure environment and generate child tables in the secure environment that inherit data from respective base tables in the productive environment of the database 120. In this example, when the test user makes a modification to the data of a base table in the productive environment of the database 120, a child table may be created in the secure environment of the database 120 which stores the modified data. In addition, the database 120 may retrieve table entries from the child tables in the secure environment instead of the base tables stored in the productive environment when operating on the data. For example, when an operation is run on a base table from the productive environment, the database 120 may retrieve any modified data from the child table corresponding to the base table, first, and retrieve unchanged data directly from the base table in the productive environment to supplement the data retrieved from the child table. In this case, only if a table entry is not present in the child table is it consumed from the base table. Here, the database 120 may generate and store access instructions or an access sequence when the child tables are generated such that the database 120 knows to retrieve the data from the child tables first instead of and prior to receiving data from the base tables. All changes performed by the test user may be written by the database 120 to the inheriting child tables within the secure environment of the database 120 and not the base tables within the productive environment of the databases 120. Accordingly, it is possible for the test user to execute an entire end-to-end scenario of Structured Query Language (SQL) database operations on modified data included in the inheriting tables within the secure environment of the database 120 without any further damage being done to productive data in the database 120.

When a user is accessing one or more of the databases 120, 122, and 124 as a reserved/test user, a message may be shown on a user interface displayed on a display of the user computing device 110 indicating that the changes are being performed in the secure environment only. Additionally, an edit button could be provided on the user interface to make changes to the data within the secure environment. All changes made to the tables through the editing process are stored in the child tables and not in the base tables. Meanwhile, all other users may continue to access the productive data within the same databases 120, 122, and 124, while only the reserved user for which the secured environment is activated accesses the inherited child table data. This enables the reserved user to make changes to inherited data in the secure environment of the databases 120, 122, and 124 without damaging productive data in the productive environment of the databases 120, 122, and 124, while also simultaneously allowing other users to operate on the productive data within the productive environment of the databases 120, 122, and 124.

Although the user computing device 110 is shown as a remote computer in the example of FIG. 1, it should be appreciated that the embodiments are not limited thereto. For example, the remote computing device 110 may be coupled to one or more of the databases 120, 122, and 124 such that they are implemented as a single entity. As another example, the user computing device 110 may be connected to one or more of the databases 120, 122, and 124 via a cable. As yet another example, a reserved user may access the databases 120, 122, and 124 locally using locally connected input units, display units, etc.

Figure 2:
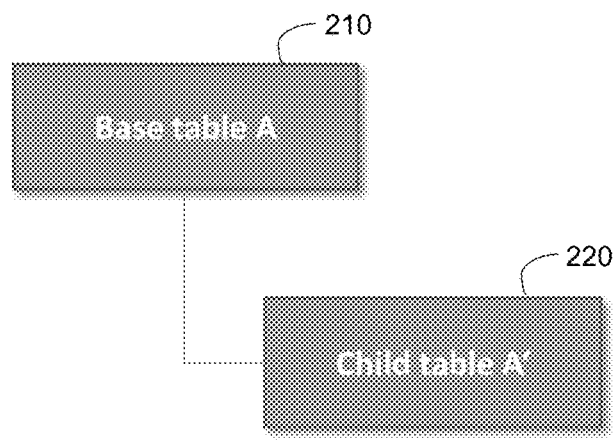
FIG. 2 is a diagram illustrating a child table that inherits from a base table in accordance with an example embodiment.

FIG. 2 illustrates a child table 220 that inherits data from a base table 210 in accordance with an example embodiment. For example, the base table 210 may be a base table in a productive system such as one of the databases 120, 122, and 124 shown in FIG. 1, or another computing system. Likewise, the child table 220 may include table entries from the base table 210 which have been modified while all unchanged data may remain in the base table 210 without being transferred to the child table 220. Accordingly, only modified data may be moved to the child table 220 where it can be tested. According to various embodiments, the child table 220 may be stored within a secure container of the same productive system in which the base table is stored. The example embodiments transfer data from the base table 210 to the child table 220. For example, the child table 220 may inherit table entries from the base table 210 on a database level. This type of inheritance may include defining linkages to configure which child tables shall inherit from which base tables. According to various aspects, a database table such as child table 220 may inherit from another table such as base table 210 if a technical structure of each table is the same (e.g., field list, field types, keys, etc.). Meanwhile, if the technical structure is not a match, then the child table 220 may not inherit from the base table 210.

Figure 3A:
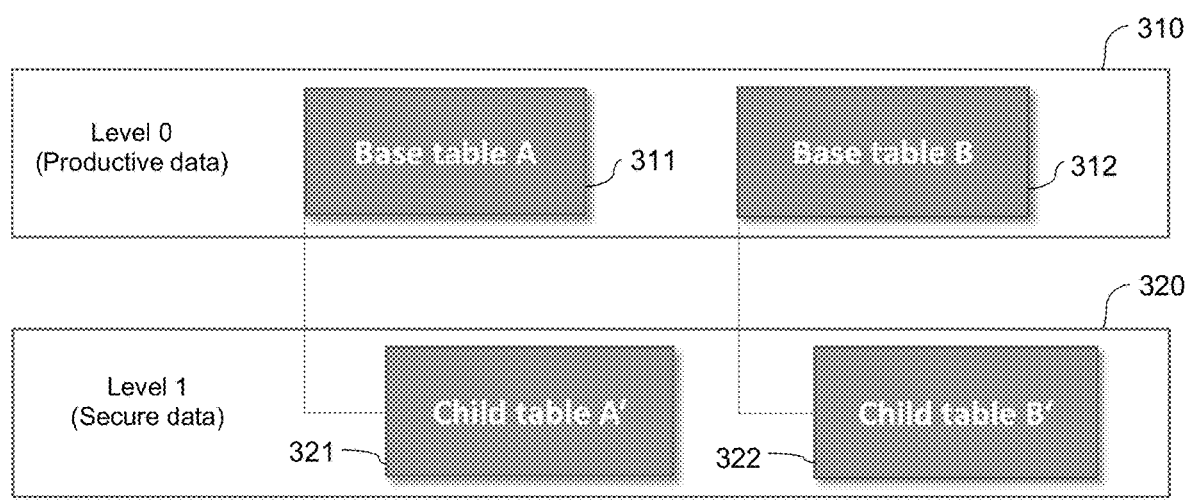
FIG. 3A is a diagram illustrating a productive environment and a secure environment of a productive system in accordance with an example embodiment.

FIG. 3A illustrates a productive environment and a secure environment of a productive system in accordance with an example embodiment. For example, the productive system may be one of the databases 120, 122, and 124 shown in FIG. 1, or another computing system. In this example, productive users or business related users access and operate on data in a productive environment 310. Here, the productive environment 310 includes a base table 311 and a base table 312. According to various embodiments, to enable a user or a system to change data for test purposes 'locally' within the productive system without influencing the productive environment 310, a secure environment 320 can be generated or established within the productive system. The secure environment 320 may be logically and/or physically separated from the productive environment 310 such that productive users operating within the productive environment 310 are not able to access the secure environment 320.

The secure environment 320 may be accessible to a test user or other reserved user. When the user logs in or otherwise access the productive system, the system can detect that the user has access rights to the secure environment 320 and provide the user access to the secured environment 320. In operation, the test user may be operating on a computing device having a display. The productive system may output a user interface which displays a listing of data stored in the productive environment 310 and which is capable of receiving input from the test user for modifying and repairing data. For example, the user interface may allow the test user to input SQL operations, and the like, for retrieving the data and for operating on the data. In an example, the user interface may be the same user interface which productive users are provided with. The only difference is that the test user may operate on child tables. The different treatment of the data is handled on the database level directly (e.g., database interface layer) such that the test user is unaware of the child tables.

Other database commands and operations may also be input during testing of the repaired data. Changes to the data may be executed automatically due to the changes made by the test user. For example, various SQL statements (read/create/modify/update/delete) may be executed by the system. All changes to the data are performed automatically on the generated child tables. The child tables can be generated by the productive system on the fly if they do not yet exist. There might also be different user interfaces which are provided by a productive system. For example, the productive system may provide a user interface for displaying and modifying data on the database, as well as different user interfaces for case workers that handle different types of business cases. It should also be appreciated that data (e.g., a business object) may be repaired in different ways. For example, the underlying customizing of the business object may be changed, the business may could be changed directly on the database level by changing erroneous fields, different processes may be executed on the business object to repair the data, and the like.

In the example of FIG. 3A, when the test user modifies the base table 311 or performs an operation with the base table 311 as an input parameter that modifies the base table 311, the productive system generates a child table 321 which inherits data table entries of the modified data from the base table 311. The generation of the child table and the inheritance of data may be unknown the test user. For example, the test user may input commands (e.g., SQL operations) in order to modify and/or test the base table 311. However, instead of accessing the base table 311 directly, the productive system may access the inherited data included in the child table 321 instead, and may only access the base table 311 if a table entry is missing from the child table 321. For example, changed data may be accessed from the child table 321 while unchanged data may be accessed directly from the base table 311. For example, if an SQL Select operation, SQL Insert operation, or the like, is performed with the base table 311 being an input parameter of the SQL operation, the productive system may collect modified table entries from the inheriting child table 321 first instead of the base table 311. This pre-collection may be enhanced by the entries from the base table 311 if the table entries (e.g., unchanged data) are not present yet in the child table 321.

In order to access the data table entries from the child table 321 instead of the base table 311, the productive system may generate and store access sequence instructions or commands. The access sequence instructions could identify if a base table has any child tables, and the order in which the data should be accessed beginning with a child table and ending with the base table, and the like. The access sequence may be implemented through a mapping table, a sequence of instructions, or the like, which the database/ productive system refers to when accessing data. For example, the inheritance and the generating of the access sequence may be triggered each time the user inputs a command to perform a test operation on a base table. In addition, a validity of the access sequence may be stored which can be of special interest if there are different types of users.

Figure 3B:
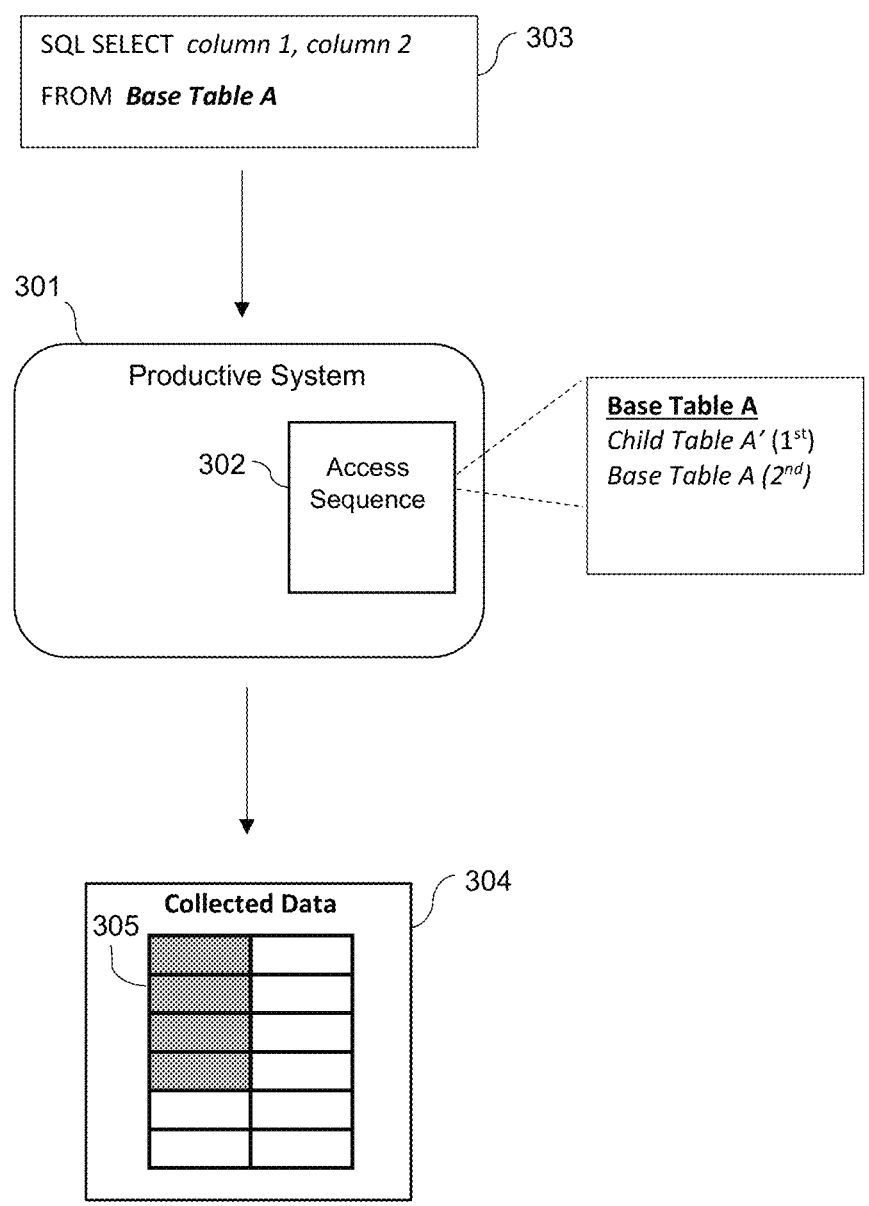
FIG. 3B is a diagram illustrating an example of an SQL operation being performed by a productive system, in accordance with an example embodiment.

An example of an SQL Select operation being performed by a productive system according to various embodiments is shown in FIG. 3B. Referring to FIG. 3B, a productive system 301 includes access sequence information 302 which stores a sequence for accessing table entries for Base Table A stored in the productive system. In this example, a test user inputs an SQL Select Statement 303 with the Base Table A as the input parameter. In response to receiving the SQL Select Statement 303, the productive system 301 checks the access sequence information 302 stored within the productive system 301, and determines that Child Table A' stored in a secure environment of the productive system 301 should be accessed prior to Base Table A stored in a productive environment. Here, the Child Table A' inherits modified data entries directly or indirectly from Base Table A. Accordingly, the productive system 301 retrieves and outputs modified inherited table entries included in the Child Table A' instead of the Base Table A which include modified data of Base Table A. The productive system 301 also supplements any missing data from Child Table A' with the unchanged data from Base Table A to generate collected data 304 corresponding to the Base Table A including modified data from Child Table A'. In the example of FIG. 3B, table entries 305 from Child Table A' are shown with a darker shade while table entries taken directly from Base Table A do not have shading. The same sequence can be performed for other SQL operations to read and write data to and from child tables stored in the secure environment based on operations with base tables as input parameters.

Figure 4:
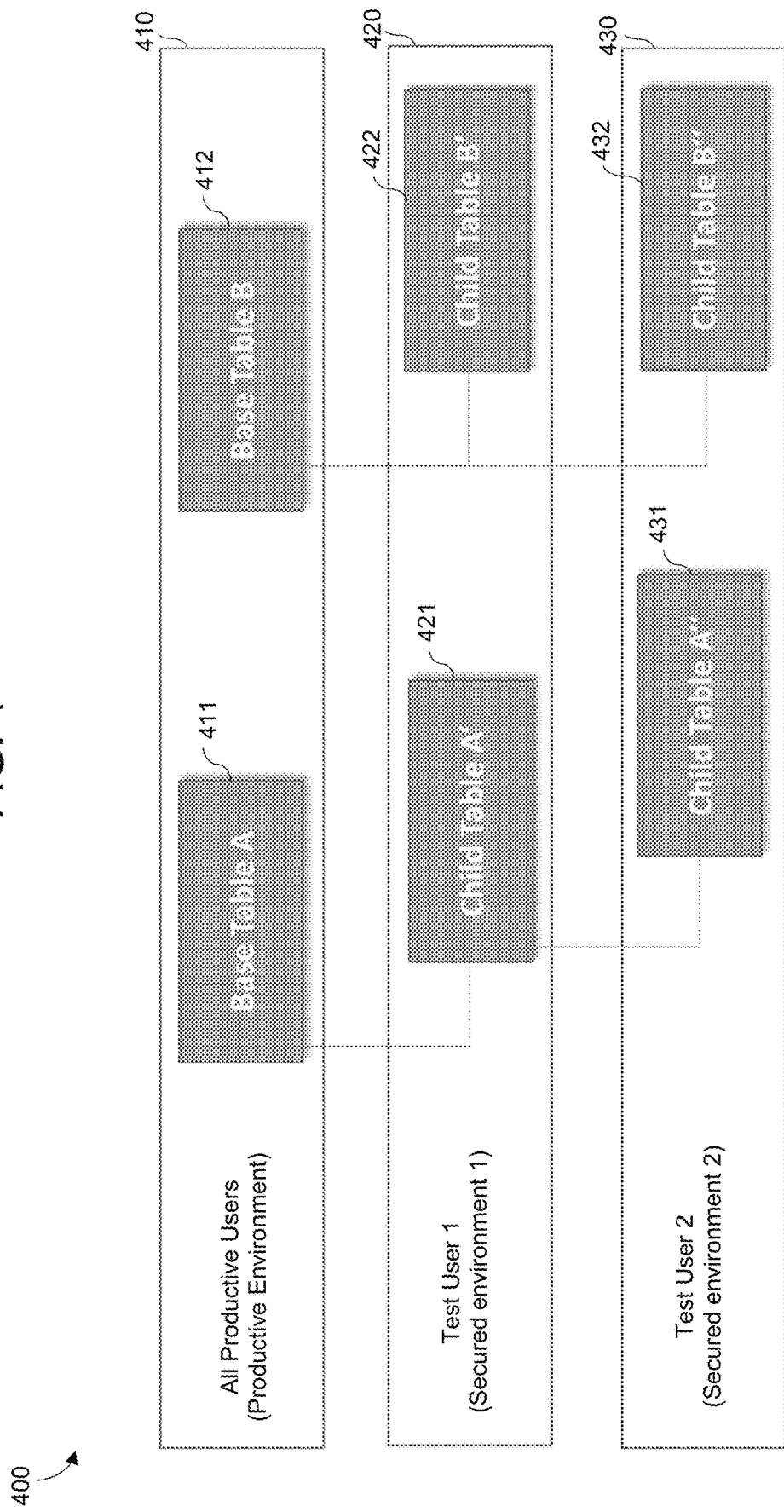
FIG. 4 is a diagram illustrating a productive environment and a secure environment of a productive system in accordance with another example embodiment.

FIG. 4 illustrates a productive environment and a secure environment of a productive system in accordance with another example embodiment. Referring to FIG. 4, the productive system includes a productive environment 410, a first secure environment 420, and a second secure environment 430. In this example, the first secure environment 420 may correspond to a first reserved user and the second secure environment 430 may correspond to a second reserved user. Also, the first and second secure environments 420 and 430 be separate from the productive environment 410 and separate from each other.

In this example, a first child table 421 in the first secure environment 420 inherits data from a base table 411 in the productive environment 410 and a second child table 431 in the second secure environment 430 inherits data from the child table 421 in the first secure environment. Meanwhile, a first child table 422 in the first secured environment 420 and a second child table 432 in the second secured environment 430 both inherit data directly from a base table 412 in the productive environment 410. In this case, access sequence information may be stored for each child table as shown below:

Access sequence for test user 2 to base table 411: 431->421->411
Access sequence for test user 2 to base table 412: 432->412
Access sequence for test user 1 to base table 411: 421->411
Access sequence for test user 1 to base table 412: 422->412
Access sequence for a productive user to base table 411: 411
Access sequence for a productive user to base table 412: 412

For example, in order to collect all relevant data correctly, an access sequence may be executed as shown in FIG. 4. The access sequence is derived from the custom inheritance relations for each particular test user. These relations can be defined depending on the reserved user (e.g., system user, application component, software component, software package, etc.) In this example, the productive system may run on data from the base tables 411 and 412 (level 0). An upgrade for software component SWC1 might be implemented and tested by test user 1 at user (level 1) while adjustments and modifications might be tested independently test user 2 at (level 2). This is merely for purposes of example, however, and other tests and repairs may be performed.

Figure 5:
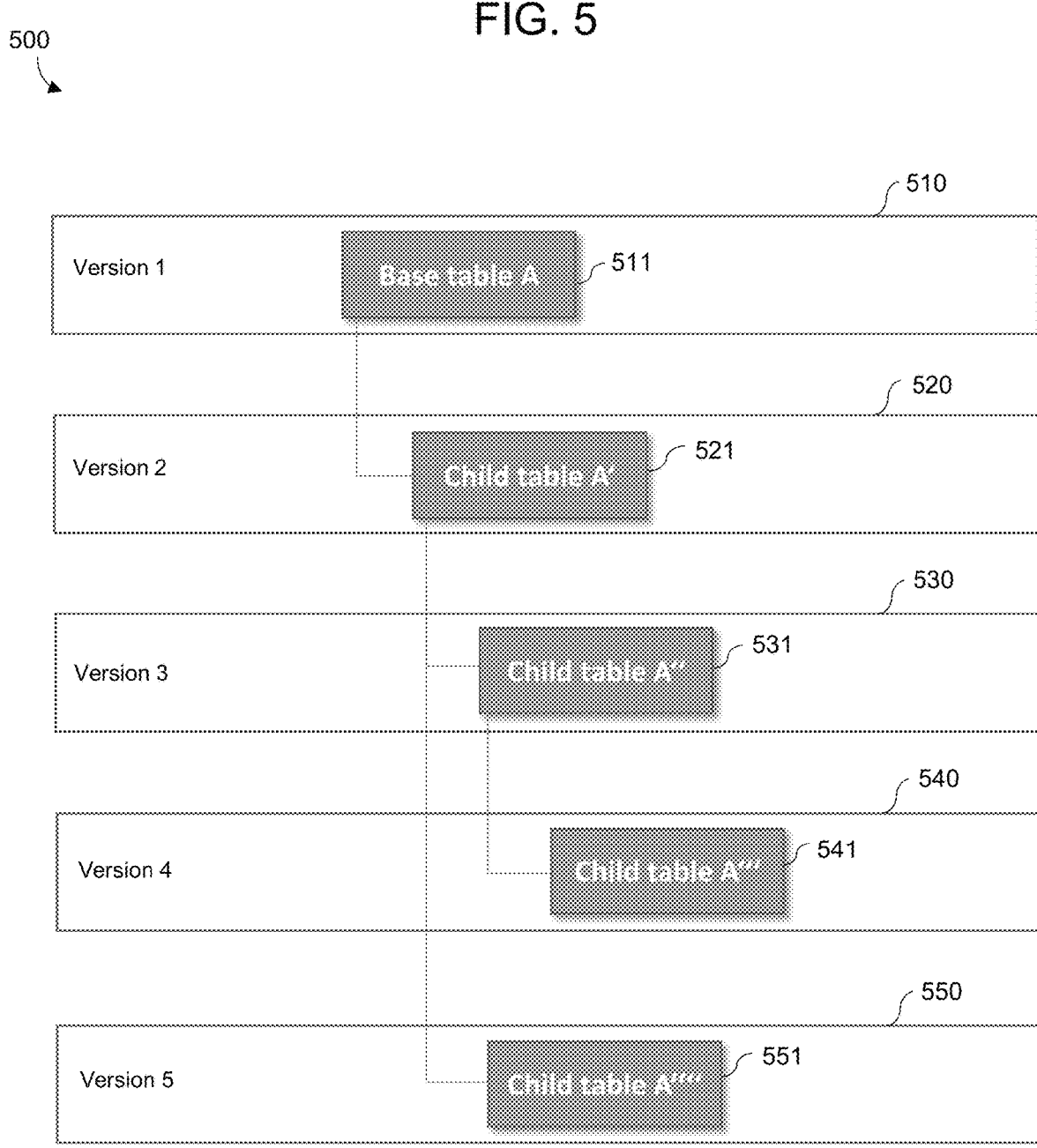
FIG. 5 is a diagram illustrating a secure environment of a productive system storing multiple versions of software in accordance with an example embodiment.

FIG. 5 illustrates a secure environment of a productive system storing multiple versions of software in accordance with an example embodiment. This use case is more complex than the previous examples. In this example, four separate secure environments 520, 530, 540, and 550 include respective child tables 521, 531, 541, and 551, which inherit data from a base table 511 included in a productive environment 510. The example embodiments provide for each secure environment to inherit a child table with a different software version. In this case, complex inheritance relationships are defined for version management. For example, in comparison to other version management systems, all versions might be used at the same time for different users having different roles.

Figure 6:
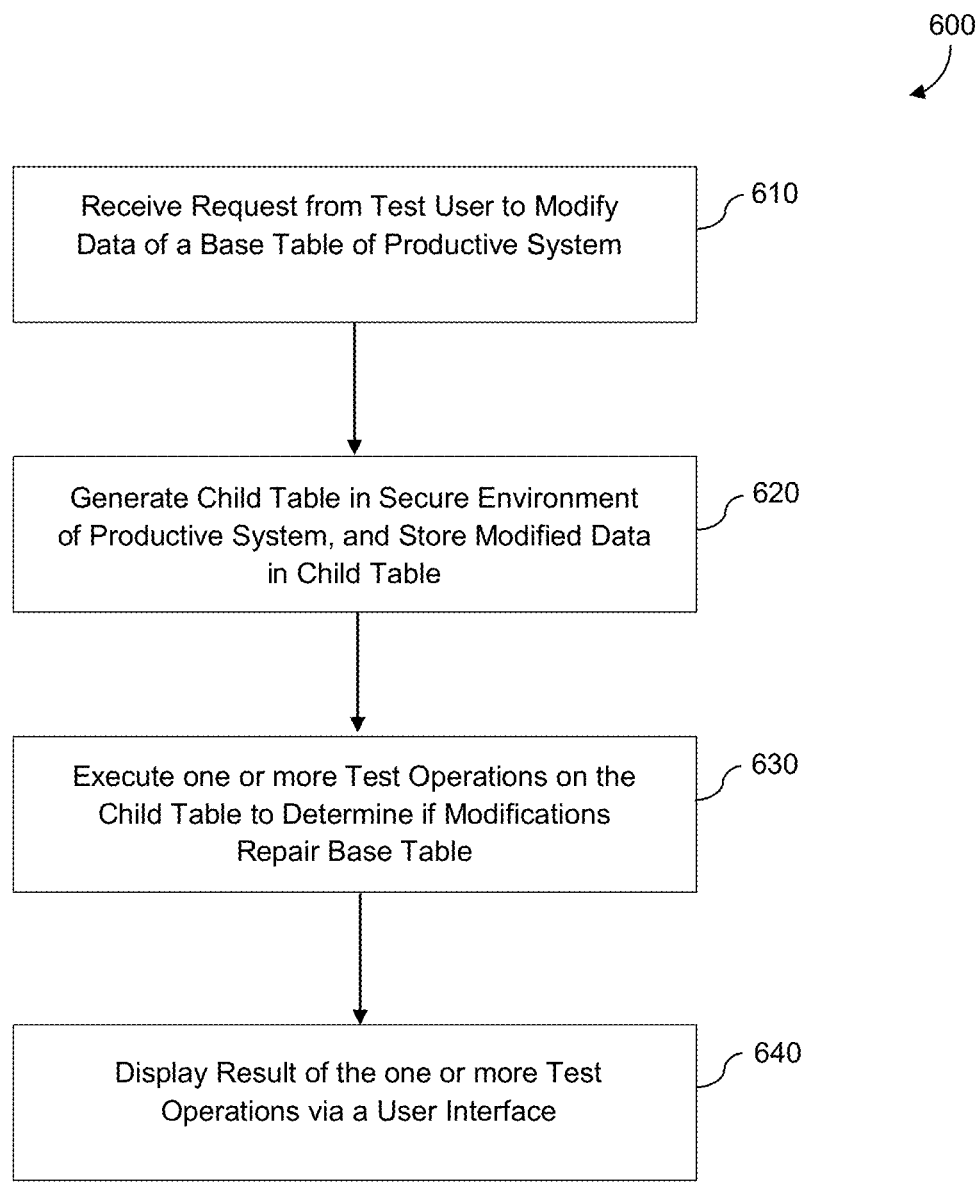
FIG. 6 is a diagram illustrating a method for modifying and testing corrupt data in a productive system in accordance with an example embodiment.

FIG. 6 illustrates a method 600 for modifying and testing corrupt data in a productive system in accordance with an example embodiment. For example, the method 600 may be performed by a productive system such as one or more of the databases 120, 122, and 124 shown in FIG. 1. Referring FIG. 6, in 610 the method includes receiving a request from a test user to modify data table entries included in a base table of the productive system. For example, the request may include the test user selecting an option corresponding to the base table via a user interface, the test user inputting an SQL operation with the base table as an input parameter, and the like. In 620, the method includes generating a child table within a secure environment of the productive system, modifying the table entries, and storing the modified table entries in the child table. The secure environment may be created within the productive system such that it is separated from a productive environment of the productive system. The generated child table may include table entries that are inherited from a base table included in the productive environment of the productive system. For example, the table entries may be inherited from a potentially corrupt base table.

Although not shown in FIG. 6, in some embodiments, prior to generating the child table, the method may further include establishing the secure environment locally within a storage (e.g., a database) of the productive system. In some embodiments, the generating in 620 may further include determining whether a user of the productive system is a productive user or a reserved user, and the generating may only be performed in 620, in response to determining the user is the reserved user and not a productive user. In some embodiments, the generating in 620 may also include generating an access sequence for retrieving table entries of the base table during testing in the secured environment. For example, the access sequence may include instructions or sequence steps to retrieve table entries from the modified child table instead of retrieving the table entries from the base table.

In 620, the method also includes modifying the generated child table, for example, by a user trying to repair the corrupt data. For example, the modification may attempt to find and repair one or more error within code, a program, a module, data, and the like. In 630, the method includes executing one or more operations on the modified data stored in the child table within the secure environment to determine if the at least one modification improves the corrupted base table, and in 640, the method includes displaying a determined result of the one or more test operations via a user interface shown on a display device. In this case, the productive system may enable productive users to run operations within the productive environment based on data from the base table within the productive environment while the one or more operations are executed on the modified child table within the secure environment by a reserved user. In some examples, in response to determining that the at least one modification repairs or otherwise improves the corrupted base table, the method may further include writing the modified child table from the secure environment to the base table included within the productive environment. As another example, in response to determining that the at least one modification does not repair the corrupted base table, the method may further include discarding the modified child table thus allowing a user to start over.

Figure 7:
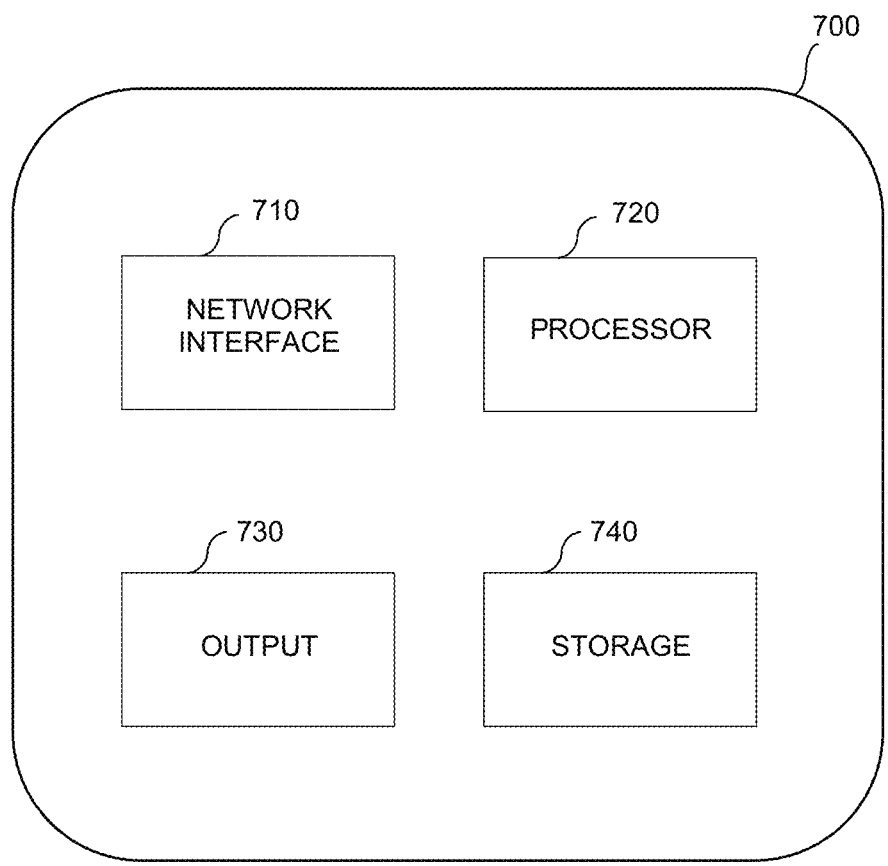
FIG. 7 is a diagram illustrating a device for modifying and testing corrupt data in a productive system in accordance with an example embodiment.

FIG. 7 illustrates a device 700 for modifying and testing corrupt data in a productive system in accordance with an example embodiment. For example, the device 700 may be included in a productive system or otherwise coupled to or remotely connected to the productive system such as an external computing device, cloud platform, and the like. Referring to FIG. 7, the device 700 includes a network interface 710, a processor 720, an output 730, and a storage 740 which may also include one or more databases. The device 700 may include other components such as a display, an input unit, a receiver/transmitter, and the like. The network interface 710 may transmit and receive data over a network such as the Internet, a private network, a public network, and the like. The network interface 710 may be a wireless interface, a wired interface, or a combination thereof. The processor 720 may include one or more processing devices each including one or more processing cores. In some examples, the processor 720 is a multicore processor or a plurality of multicore processors. Also, the processor 720 may be fixed or it may be reconfigurable. The output 730 may output data to an embedded display of the device 700, an externally connected display, a cloud, another device, and the like. The storage device 740 is not limited to any particular storage device such as RAM, ROM, hard disk, and the like, and may include one or more databases such as a relational database.

According to various embodiments, the processor 720 may establish a secure environment within the productive system. The secure environment may be established by the processor 720 such that it is separate from a productive environment of the productive system. The processor 720 may generate a child table within the secure environment of the productive system for enabling a user to operate on the child table. The generated child table may include table entries that are inherited from a corrupted base table included in the productive environment of the productive system. For example, the processor 720 may transfer the table entries from a base table in the productive environment to the child table in the secure environment.

In order to try to repair the corrupt data, a user may input a command through the device 700 (such as through an input unit) in order to modify the data. The modification causes the processor 720 to generate a child table and store the modified data as entries in the child table instead of modifying data directly from a base table. Here, the child table may be generated on the fly if the child table is not present. Furthermore, the user may input one or more operations/commands and the processor 720 may execute the operations/commands on the child table within the secure environment to determine if the at least one modification improves the corrupted base table. The output 730 may output a determined result of the one or more operations to a user interface shown on a display device such as an embedded display, an externally connected display, or a display of a separate user device. In this last case, the user device may communicate with the device 700 by transmitting commands and receiving output through the network interface 710. The processor 720 may execute operations on productive data (base tables) in the productive environment of the productive system based on commands from productive users and simultaneously execute operations/commands on child tables in the secure environment of the productive system based on commands from a reserved user. In this case, the processor 720 may determine whether a user of the productive system is a productive user or a reserved user, and generate the child table only in response to determining the user is the reserved user and not the productive user.

In response to determining that the at least one modification performed on the child table in the secure environment will repair the corrupted base table, the processor 720 may write the modified child table from the secure environment to the corresponding base table included within the productive environment. However, if the test user determines that the at least one modification does not repair the corrupted base table, the processor 720 may discard the modified child table allowing the test user to start the process of modifying again. Also, the processor 720 may generate an access sequence for retrieving table entries of the base table during testing in the secured environment. Here, the access sequence may include instructions for the processor 720 to retrieve the table entries from the modified child table in the secure environment instead of retrieving the table entries from the base table in the productive environment. The access sequence may be stored in the storage 740 and accessed by the device 700 when performing operations and commands on the productive system.

Figure 8:
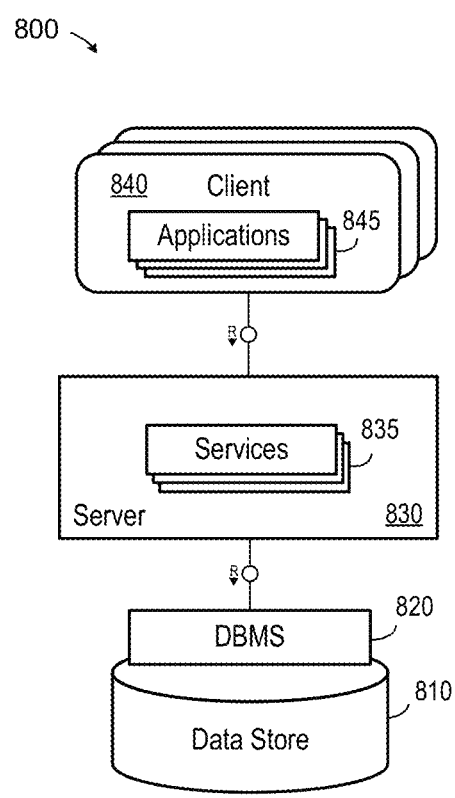
FIG. 8 is a diagram illustrating an example of a database architecture in accordance with an example embodiment.

FIG. 8 is a diagram illustrating an example of a database architecture 800 in accordance with an example embodiment. It should be appreciated that the embodiments are not limited to architecture 800 or to a database architecture, however, FIG. 8 is shown for purposes of example. Also, the database architecture 800 may be implemented by a productive system. Referring to FIG. 8, the architecture 800 includes a data store 810, a database management system (DBMS) 820, a server 830, services 835, clients 840 and applications 845. Generally, services 835 executing within server 830 receive requests from applications 845 executing on clients 840 and provides results to applications 845 based on data stored within data store 810. For example, server 830 may execute and provide services 835 to applications 845. Services 835 may comprise server-side executable program code (e.g., compiled code, scripts, etc.) which provide functionality to applications 845 by providing user interfaces to clients 140, receiving requests from applications 845 (e.g., drag-and-drop operations), retrieving data from data store 810 based on the requests, processing the data received from data store 810, and providing the processed data to applications 845.

In one example, the data store 810 includes a productive environment where productive data is accessible and a secure environment where test data that is inherited from the productive environment is simultaneously available. For example, an application 845 may correspond to an inheritance-based application described according to various embodiments that enables a reserved user to interact with the secure environment of the data store 810. In this example, a client 840 executes the inheritance-based application to generate a user interface for a user on a display of the client 840 which allows the user to enter commands and operations to retrieve data and test data from the secured environment of the data store 810. It also allows the user to write data to from the secured environment of data store 810 to the productive environment. The application 845 may pass information and commands based on the input to one of services 835. An SQL script may be generated based on the request and forwarded to DBMS 820. DBMS 820 executes the SQL script to return a result set based on data of data store 810, and the application 845 creates a report/visualization based on the result set. As another example, the time and billing information input by the user may be provided directly from the application to the DBMS 820 or the data store 810.

The services 835 executing on server 830 may communicate with DBMS 820 using database management interfaces such as, but not limited to, Open Database Connectivity (ODBC) and Java Database Connectivity (JDBC) interfaces. These types of services 835 may use Structured Query Language (SQL) to manage, query, and repair corrupted data stored in data store 810 as well as manage and query uncorrupted data. The DBMS 820 serves requests to query, retrieve, create, modify (update), and/or delete data of data store 810, and also performs administrative and management functions. Such functions may include snapshot and backup management, indexing, optimization, garbage collection, and/or any other database functions that are or become known.

Server 830 may be separated from or closely integrated with DBMS 820. A closely-integrated server 830 may enable execution of services 835 completely on the database platform, without the need for an additional server. For example, server 830 may provide a comprehensive set of embedded services which provide end-to-end support for Web-based applications. The services 835 may include a lightweight web server, configurable support for Open Data Protocol, server-side JavaScript execution and access to SQL and SQLScript. Server 830 may provide application services (e.g., via functional libraries) using services 835 that manage and query the data of data store 810. The application services can be used to expose the database data model, with its tables, views and database procedures, to clients 840. In addition to exposing the data model, server 830 may host system services such as a search service.

Data store 810 may comprise any query-responsive data source or sources that are or become known, including but not limited to a structured-query language (SQL) relational database management system. Data store 810 may include a relational database, a multi-dimensional database, an Extensible Markup Language (XML) document, or any other data storage system storing structured and/or unstructured data. The data store may 810 may referred to or may be included within a production system or productive system. The data of data store 810 may be distributed among several relational databases, dimensional databases, and/or other data sources. Embodiments are not limited to any number or types of data sources. In some embodiments, the data of data store 810 may include one or more of conventional tabular data, row-based data, column-based data, and object-based data. Moreover, the data may be indexed and/or selectively replicated in an index to allow fast searching and retrieval thereof. Data store 810 may support multi-tenancy to separately support multiple unrelated clients by providing multiple logical database systems which are programmatically isolated from one another.

The architecture 800 may include metadata defining objects which are mapped to logical entities of data store 810. The metadata be stored in data store 810 and/or a separate repository (not shown). The metadata may include information regarding dimension names (e.g., country, year, product, etc.), dimension hierarchies (e.g., country, state, city, etc.), measure names (profit, units, sales, etc.) and any other suitable metadata. According to some embodiments, the metadata includes information associating users, queries, query patterns and visualizations. The information may be collected during operation of system and may be used to determine a visualization to present in response to a received query, and based on the query and the user from whom the query was received.

Each of clients 840 may include one or more devices executing program code of an application 845 for presenting user interfaces to allow interaction with application server 830. The user interfaces of applications 845 may comprise user interfaces suited for reporting, data analysis, and/or any other functions based on the data of data store 810. Presentation of a user interface as described herein may include any degree or type of rendering, depending on the type of user interface code generated by server 830. For example, a client 840 may execute a Web Browser to request and receive a Web page (e.g., in HTML format) from application server 130 via HTTP, HTTPS, and/or Web Socket, and may render and present the Web page according to known protocols. One or more of clients 840 may also or alternatively present user interfaces by executing a standalone executable file (e.g., an .exe file) or code (e.g., a JAVA applet) within a virtual machine.

According to various embodiments, provided herein is a productive system that generates a secure environment locally within the productive system thereby enabling corrupt data included within a productive environment thereof to be modified and repaired within the secure environment without affecting the productive environment. For example, the productive system may generate a child table in the secure environment that inherits corrupt data from a base table in the productive environment. The inherited data of the child table may be modified by a user and SQL operations or other test operations may be executed on the child table in the secure environment to determine whether the modifications will repair the corrupt data in the productive environment. When a successful modification is determined, the modified child table may be transferred from the secure environment into the productive environment and may be used to replace the corresponding base table.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   a processor configured to
      perform an operation to modify one or more table entries from a corrupted base table in a productive environment, and in response, generate a child table in a secure environment that inherits the one or more table entries from the corrupted base table,
      execute operations to modify the one or more table entries in the child table within the secure environment to determine if the one or more modified table entries repair the corrupted base table, and
      when the repair is determined, write the one or more modified table entries from the child table to the corrupted base table.

2. The computing system of claim 1, wherein the one or more table entries from the corrupted base table comprise one or more corrupted table entries.

3. The computing system of claim 1, wherein the processor is configured to perform one or more of a delete, an insert, a write, and a repair on the one or more table entries to generate the modified table entries.

4. The computing system of claim 1, wherein the processor is configured to execute one or more structured query language (SQL) operations on the modified table entries stored in the child table.

5. The computing system of claim 1, wherein fields and field types in the corrupted base table are the same as fields and field types in the child table.

6. The computing system of claim 1, wherein the processor is further configured to generate access sequence instructions that identify an order of access by a database between the child table and the corrupted base table.

7. The computing system of claim 1, wherein the processor is further configured to replace the corrupted base table with the child table, in response to successful repair of the one or more table entries in the child table.

8. The computing system of claim 1, wherein the corrupted base table and the child table are simultaneously accessible by a productive user and a test user, respectively.

9. A method comprising:
   performing an operation to modify one or more table entries from a corrupted base table in a productive environment, and in response, generating a child table in a secure environment that inherits the one or more table entries from the corrupted base table;
   executing operations to modify the one or more table entries in the child table within the secure environment to determine if the one or more modified table entries repair the corrupted base table; and
   when the repair is determined, writing the one or more modified table entries from the child table to the corrupted base table.

10. The method of claim 9, wherein the one or more table entries from the corrupted base table comprise one or more corrupted table entries.

11. The method of claim 9, wherein the modifying comprises one or more of a deleting, inserting, writing, and repairing on the one or more table entries to generate the modified table entries.

12. The method of claim 9, wherein the executing comprises executing one or more structured query language (SQL) operations on the modified table entries stored in the child table.

13. The method of claim 9, wherein fields and field types in the corrupted base table are the same as fields and field types in the child table.

14. The method of claim 9, wherein the method further comprises generating access sequence instructions that identify an order of access by a database between the child table and the corrupted base table.

15. The method of claim 9, wherein the method further comprises replacing the corrupted base table with the child table, in response to successful repair of the one or more table entries in the child table.

16. The method of claim 9, wherein the corrupted base table and the child table are simultaneously accessible by a productive user and a test user, respectively.

17. A non-transitory computer-readable medium comprising instructions that when executed cause a computer to perform a method comprising:
   performing an operation to modify one or more table entries from a corrupted base table in a productive environment, and in response, generating a child table in a secure environment that inherits the one or more table entries from the corrupted base table;
   executing operations to modify the one or more table entries in the child table within the secure environment to determine if the one or more modified table entries repair the corrupted base table; and
   when the repair is determined, writing the one or more modified table entries from the child table to the corrupted base table.

18. The non-transitory computer-readable medium of claim 17, wherein the one or more table entries from the corrupted base table comprise one or more corrupted table entries.

19. The non-transitory computer-readable medium of claim 17, wherein the modifying comprises one or more of a deleting, inserting, writing, and repairing on the one or more table entries to generate the modified table entries.

20. The non-transitory computer-readable medium of claim 17, wherein the executing comprises executing one or more structured query language (SQL) operations on the modified table entries stored in the child table.

* * * * *